Dec. 7, 1948.  B. E. LUBOSHEZ  2,455,789
OPTICAL RECTIFICATION FOR MOTION
PICTURE APPARATUS AND THE LIKE
Filed Sept. 10, 1947  2 Sheets—Sheet 1
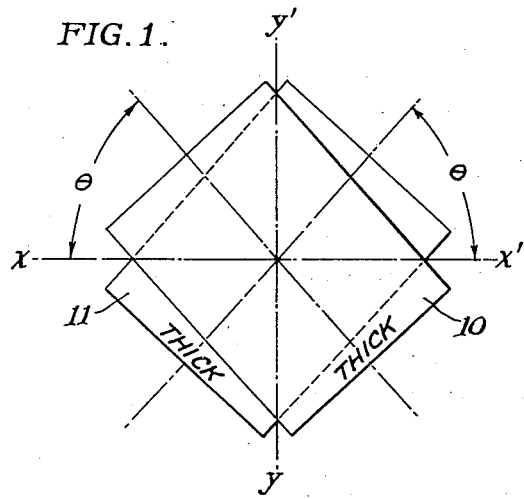
FIG. 1.
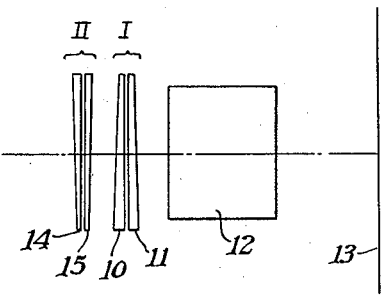
FIG. 2.
FIG. 3.
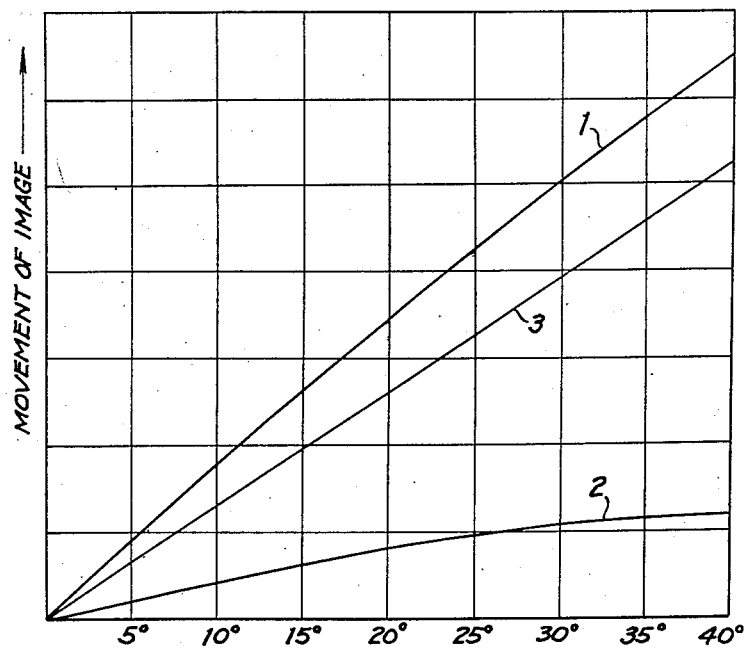
BENJAMIN E. LUBOSHEZ
INVENTOR
BY
ATTORNEYS Dec. 7, 1948.  B. E. LUBOSHEZ  2,455,789
OPTICAL RECTIFICATION FOR MOTION
PICTURE APPARATUS AND THE LIKE
Filed Sept. 10, 1947   2 Sheets-Sheet 2
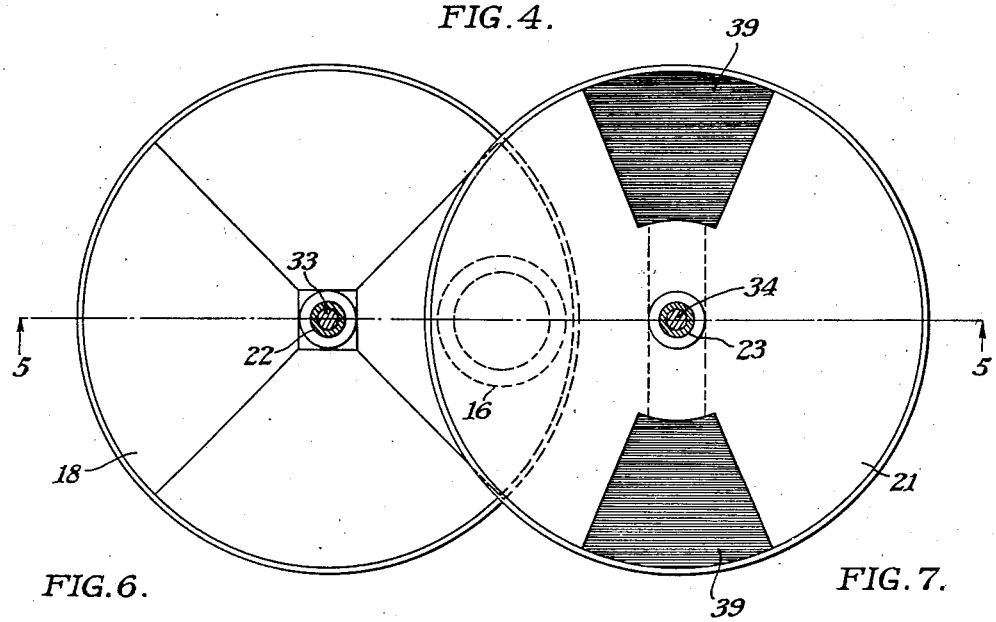
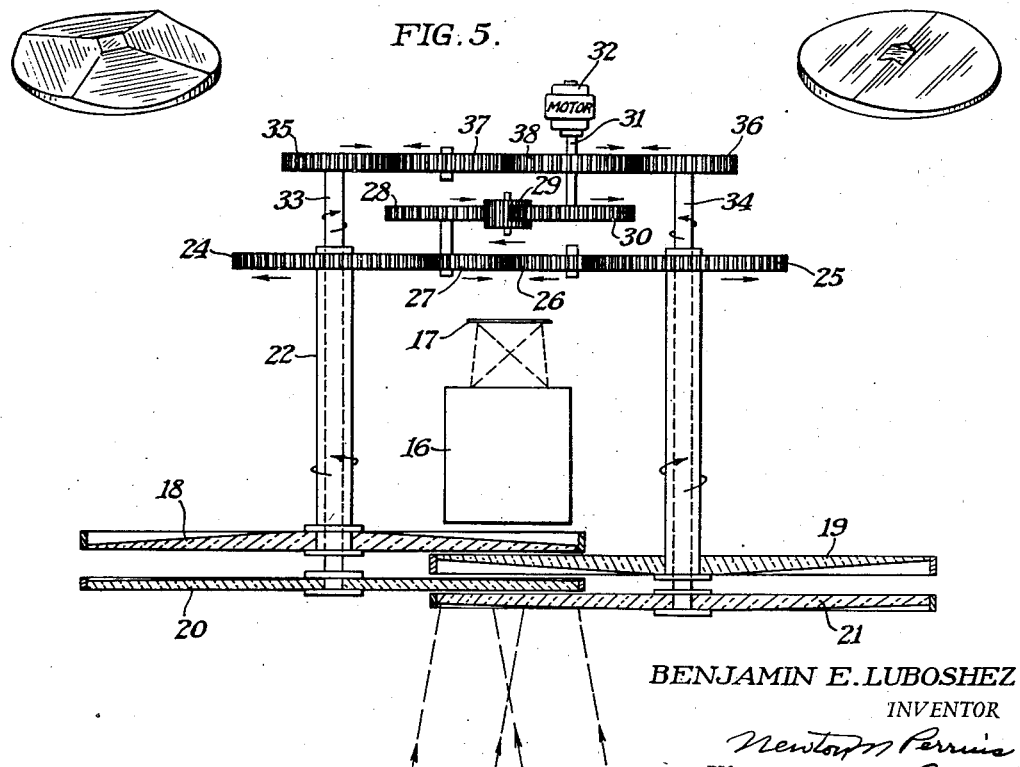
BENJAMIN E. LUBOSHEZ
INVENTOR
ATTORNEYS Patented Dec. 7, 1948

2,455,789

UNITED STATES PATENT OFFICE 2,455,789

OPTICAL RECTIFICATION FOR MOTION-PICTURE APPARATUS AND THE LIKE

Benjamin Ellan Luboshez, Rochester, N. Y., assignor to Eastman Kodak Company, Rochester, N. Y., a corporation of New Jersey Application September 10, 1947, Serial No. 773,205

5 Claims. (Cl. 88—16.8)

1

This invention relates to motion picture apparatus of the type in which the film moves continuously rather than intermittently.

Such apparatus permits the design of all moving parts to have uniform circular motion whereby it is particularly suitable for operating at high speeds which may be required in connection with color television and other special applications. At the same time, cameras and projectors through which the film moves continuously have many practical advantages rendering them suitable for all ordinary cinematographic purposes.

With uniform movement of both the film and the optical compensating means it is necessary for the principal ray of the objective at its intersection of the film plane to move at the same uniform speed as the film. With simple compensators the relation between the movement of the compensator and the principal ray is not linear and in practice satisfactory compensation can be obtained only for very short movements. In other words, only a small portion of each compensating cycle can be employed for the transmission of light while a large portion of each cycle is wasted. The disadvantages of such waste in both cameras and projectors are obvious.

The primary object of the invention is the provision of optical compensating means which will materially increase the ratio of the time available in motion picture apparatus for exposure, or projection, to the time wasted during the passage from one picture frame to the next.

Another object of the invention is the provision of optical compensating means which permits full utilization of the relative aperture of its associated objective.

Another object of the invention is the provision of motion picture apparatus in which optical compensation takes place in front of the objective whereby the back focus of the objective is not limited.

Another object of the invention is the provision of an optical compensator which does not introduce serious optical aberrations.

Other objects of the invention will become apparent from the following description when read in connection with the accompanying drawing in which Fig. 1 shows two simple prisms being rotated to deviate a light beam;

Fig. 2 shows diagrammatically two pairs of prisms in tandem in accordance with the invention;

Fig. 3 is a graphical representation of the

2 relationship between the movement of image and the angular movement of the prisms in the arrangement of Fig. 2;

Figs. 4 and 5 are front and plan views, respectively, partly in section of a motion picture apparatus embodying the preferred form of the invention; and Figs. 6 and 7 are views in perspective of compound prism elements which may be employed.

It is known that a pair of equal wedges will when rotated by equal amounts in opposite directions produce in a single plane a deviation of a light beam which varies sinusoidally from zero to twice the refracting angle of a single wedge. It is obvious that this deviation can be proportional to the angle of rotation only over very small rotations from the zero positions and if such a device is placed in front of a lens the system would be quite wasteful of time by being inoperable most of each cycle. The above can easily be demonstrated by reference to Fig. 1 wherein two equal wedges 10 and 11 are shown as having been rotated through an angle $\theta$ about an axis perpendicular to the plane of the drawing. If the deviation of each wedge in its plane of symmetry be denoted by $d$, then the deviation in the $yy'$ plane is $$d \cdot \sin \theta$$

and the deviation in the $xx'$ plane is $$d \cdot \cos \theta$$

for each wedge individually. The deviation due to the two wedges 10 and 11 acting together will be, in the $yy'$ plane $$2 \cdot d \cdot \sin \theta$$

and in the $xx'$ plane, zero since the cosine deviations are equal and opposite.

In any practical machine wherein all parts move at constant speed, the transition from maximum deviation in one direction to maximum deviation in the opposite direction must take place at a uniform rate within a high degree of precision. According to the present invention this result is accomplished by employing an additional pair of equal wedges mounted for equal and opposite rotation either in front of or behind the primary pair of wedges. The wedges of the additional pair differ in power and angular velocity from the primary pair in a manner now to be considered.

In the arrangement shown diagrammatically in Fig. 2, an objective 12 adapted to image a distant object on a moving film 13 has positioned on its long optical side two pairs I and II of rotatable wedges, group I comprising the primary wedges 10, 11 and group II the additional wedges 14, 15 discussed above.

If we let $D_1$ be the resultant deviation in the $yy'$ plane due to the wedges of group I, $D_2$ be the resultant deviation in the $yy'$ plane due to the wedges of group II, and D be the resultant deviation due to both groups acting together in the $yy'$ plane, then the following relations exist:

$$D_1 = 2 \cdot d_1 \cdot \sin \theta_1 = 2 \cdot d_1 \left( \theta_1 - \frac{\theta_1^3}{6} + \cdots \right) \quad \text{Eq. 1}$$

$$D_2 = 2 \cdot d_2 \cdot \sin \theta_2 = 2 \cdot d_2 \left( \theta_2 - \frac{\theta_2^3}{6} + \cdots \right) \quad \text{Eq. 2}$$

The angles are expressed in radians and in the expansions only the first two terms are retained.

If the wedges in group II are arranged to make the direction of $D_2$ opposite to that of $D_1$ and are rotated at $m$ times the angular velocity of those in group I so that:

$$\theta_2 = -m \cdot \theta_1 \quad \text{Eq. 3}$$

then, from Eq. 2, $$D_2 = 2 \cdot d_2 \left( -m \cdot \theta_1 + m^3 \cdot \frac{\theta_1^3}{6} \right) \quad \text{Eq. 4}$$

and for total deviation from Eqs. 1 and 4

$$D = D_1 + D_2 = 2 \cdot d_1 \left( \theta_1 - \frac{\theta_1^3}{6} \right) - 2 \cdot d_2 \left( m \cdot \theta_1 - m^3 \cdot \frac{\theta_1^3}{6} \right) \text{Eq. 5}$$

Now, in order that D and $\theta_1$ shall vary in simple proportionate relationship, we need to find the condition that $dD/d\theta_1$ remain constant which is that $dD^2/d\theta_1^2$ becomes zero.

From Eq. 5

$$d_2 D / d\theta_1^2 = -2 - d_1 \cdot \theta_1 + 2 - d_2 \cdot m^3 \cdot \theta_1 = 0$$

Since $d_1$, $d_2$ and $m$ are all finite as well as $\theta_1$ in all but the zero position, the following condition obtains:

$$d_1 = m^3 \cdot d_2$$

Thus, if the wedges in group II are rotated at twice the angular velocity ($m=2$) of those in group I, then $d_1 = 8 \cdot d_2$ which means that the wedges of group I must give eight times as much deviation as those in group II.

Under these conditions, the resultant deviation due to both groups acting together is given by $$D = 2 \cdot d \cdot [\sin \theta - \sin (2 \cdot \theta)/8]$$

where $d$ and $\theta$ now refer to the wedges of group I. Clearly, the regularity in the variation of D with movements of the wedges depends only upon the factor within the brackets, the first term of which is contributed by the principal pair of wedges and the second term by the auxiliary pair. These factors are represented graphically in Fig. 3 where curve 1 represents simply the sine of the angle which one of the wedges in the principal pair makes with the neutral position. This angle $\theta$ is shown on the scale at the bottom of the diagram. Curve 2 represents the sine of twice $\theta$, divided by eight. Curve 3 is the difference between curves 1 and 2 and so represents the quantity inside the brackets in the equation above. Within the accuracy of the calculations the deviation of curve 3 from a straight line cannot be detected so that film and image may be made to follow each other accurately over the whole range up to values of $\theta$ reaching 40 degrees.

Thus, in the simple case when $m$ is two, that is, when the auxiliary wedges rotate at twice the speed of the principal wedges, about one quarter of the cycle can be usefully employed. During the rest of the cycle the light is cut off by means of a shutter in any suitable manner. This ratio of one quarter exposure time to three quarters nonexposure time is far better than can be obtained with comparable precision by a rotating plate. Furthermore, the aperture ratio of the lens is not limited and very minor optical aberrations are introduced. The very small amount of chromatic aberration introduced is generally quite negligible but can be made smaller by choosing a glass of low dispersion for the principal wedges and a glass of high dispersion for the auxiliary wedges. The ratio between these relative dispersions should preferably be four to one but no such glasses are now known. If warranted, full correction could be obtained by achromatizing each of the wedges individually.

In the preferred form of the invention now to be described the ratio of exposure (or projection) time to lost time is increased to almost any desired extent. Instead of rotating the wedges about an axis coincident with the optic axis of the lens as described in connection with Fig. 2, it is only necessary that the axes of rotation of the wedges be parallel to the axis of the lens and these axes may be placed outside the lens to make possible a more convenient mechanical design. A preferred form of such an arrangement is shown in Figs. 4 and 5, in front and plan views, respectively. In the apparatus shown, the factor $m$ is equal to 2 so that the auxiliary wedges rotate at twice the angular velocity of the principal wedges, and the deviating powers of the two pairs of wedges are in inverse cubic relation to their respective speed ratio, i. e., the speed ratio of 1 to 2 requires a deviating ratio of 8 to 1.

There is shown an objective 16 having at its back focus a film 17 adapted to be moved uniformly in a direction normal to the plane of the drawing in any well known manner (not shown). Arranged for rotation in front of the objective 16 are four prism disks 18, 19, 20 and 21 of which disks 18 and 19 function as the principal or primary wedges and disks 20 and 21 the auxiliary wedges. The disks 18 and 19 are carried by tubular shafts 22 and 23 and are driven in opposite directions through gears 24, 25, 26, 27, 28 and 29 by a gear 30 mounted on a shaft 31 of a suitable motor 32. The disks 20 and 21 are carried on shafts 33 and 34 extending through the tubular shafts 22 and 23 and are arranged to be driven in opposite directions through gears 35, 36 and 37 by a gear 38 mounted on the shaft 31 of the motor 32. The gear ratios are such that the disks 20 and 21 are rotated at twice the angular velocity of the disks 18 and 19.

Fig. 6 shows a form the wedges of the disks 18 and 19 may take. It will be seen it is flat on one side and forms on the other side a rather flat pyramid the four faces of which slope downwards from the center symmetrically, each face forming an angle with the base corresponding to the angle that one of the single wedges of group I of Fig. 2 would have as discussed above.

Fig. 7 shows the form the wedges for the disks 20 and 21 take in the case, as here, where they rotate at twice the speed of the wedges of disks 18 and 19. The bottom is flat and the top has two flat faces sloping at equal angles which correspond to the angles of the simple wedges of group II, Fig. 2.

Wedges such as shown in Figs. 6 and 7 can be manufactured with the necessary precision without undue expense. As a matter of fact, it is now possible to mold plastics into prisms of almost any desired shape and the shapes here employed are relatively simple.

With the arrangement above described, four frames are projected (or exposed) successively as the slow speed disks 18 and 19 with their four pairs of wedges pass in front of the objective 16. During the same time the higher speed disks 20 and 21 make two full revolutions. Masks 39 may conveniently be mounted on one of the higher speed disks 21 so as to pass in front of the objective 16 whenever a dividing ridge of the wedges passes the optic axis. This makes a very convenient shutter. With the proportions shown, three quarters of the total time available during each cycle is utilized for projection (or exposure) while only one quarter of the time is lost.

No means for moving the film 17 has been illustrated since to do so would merely complicate the drawing without being of any practical aid to one skilled in the art. Any other suitable means may be employed for driving the four disks in their proper timed relation with one another and with the movement of the film.

While the preferred form of the invention has been illustrated and described it will be evident to one skilled in the art that the apparatus may take other forms without departing from the invention the scope of which is pointed out in the appended claims.

I claim:

1. In motion picture apparatus of the type in which the film moves continuously at a uniform velocity, a stationary objective, a matched pair of prisms rotatable in opposite directions in front of the objective and in such phase relation as to deviate a light ray in the direction the film moves, a second matched pair of prisms rotatable in opposite directions in front of the objective and in such phase relation as to deviate a light ray in the direction opposite that of the film movement, the deviating power of the second pair of prisms being one-eighth that of the first pair, and means for rotating the second pair of prisms at twice the speed of the first pair of prisms.

2. In an optical system for obtaining a stationary image from a moving one, or vice versa, the combination with an objective of a primary pair of equally and oppositely rotatable prisms and an auxiliary pair of equally and oppositely rotatable prisms, the rotation of the two pairs being such as to produce deviations in opposite directions, and the deviating power of the primary pair being eight times greater than the deviating power of the auxiliary pair, whereby rotation of the auxiliary pair at twice the angular velocity of the primary pair will produce a resultant deviation which is linear with respect to the angle through which any one of the prisms rotates.

3. The apparatus of claim 1 wherein the prisms are segments of disks rotatable about axes spaced on opposite sides of the objective, such axes and the optic axis being parallel and defining a plane perpendicular to the direction of the film movement.

4. Apparatus for bending a light ray at a uniform angular rate with optical parts having uniform circular motion comprising two pairs of overlapping rotatable disks, each pair of disks comprising a plurality of complementary refracting prisms rotatable in opposite directions, one pair of disks having half as many prisms as, one eighth the refracting power of, and rotatable at twice the angular velocity of the other pair of disks, and the two pairs of disks being oppositely rotatable so as to deviate the light ray in opposite directions.

5. Optical rectifying apparatus of the type in which a beam of light is deviated by oppositely rotated matched prisms characterized by the provision of auxiliary matched prisms for deviating the beam in an opposite sense, said auxiliary prisms being rotatable at a higher speed than the first mentioned prisms, and the ratio of the deviating powers of the two sets of prisms being inversely proportional to the cube of their speed ratio.

BENJAMIN ELLAN LUBOSHEZ.

REFERENCES CITED

The following references are of record in the file of this patent:

UNITED STATES PATENTS

| Number | Name | Date |
| --- | --- | --- |
| 1,356,787 | Porter | Oct. 26, 1920 |
| 2,352,214 | Ligh | June 27, 1944 |

FOREIGN PATENTS

| Number | Country | Date |
| --- | --- | --- |
| 323,089 | France | Oct. 28, 1902 |